March 12, 1968 H. J. HANSEN 3,372,988
PROCESS AND APPARATUS FOR PERFORMING
REACTIONS IN THE GASEOUS PHASE
Filed Sept. 18, 1964 2 Sheets-Sheet 1

INVENTOR.
Hans Jürgen Hansen
BY
James E. Bryan
ATTORNEY

March 12, 1968

H. J. HANSEN 3,372,988

PROCESS AND APPARATUS FOR PERFORMING
REACTIONS IN THE GASEOUS PHASE

Filed Sept. 18, 1964

INVENTOR.
Hans Jürgen Hansen
BY
James E. Bryan
ATTORNEY

United States Patent Office 3,372,988
Patented Mar. 12, 1968

3,372,988
PROCESS AND APPARATUS FOR PERFORMING REACTIONS IN THE GASEOUS PHASE
Hans Jürgen Hansen, Lyngby, Denmark, assignor to Haldor Topsøe, Hellerup, Denmark, a company of Denmark
Filed Sept. 18, 1964, Ser. No. 397,481
Claims priority, application Denmark, Sept. 28, 1963, 4,572
10 Claims. (Cl. 23—198)

ABSTRACT OF THE DISCLOSURE

This invention relates to a process and apparatus for performing catalytic reactions in the gaseous phase, the apparatus including a pressure shell preferably having a plurality of bodies of catalyst therein, means for passing a synthesis gas into the pressure shell, means for passing the gas through the catalyst bodies successively in a radial direction, and means for withdrawing a product gas from the pressure shell.

---

Figure 1:
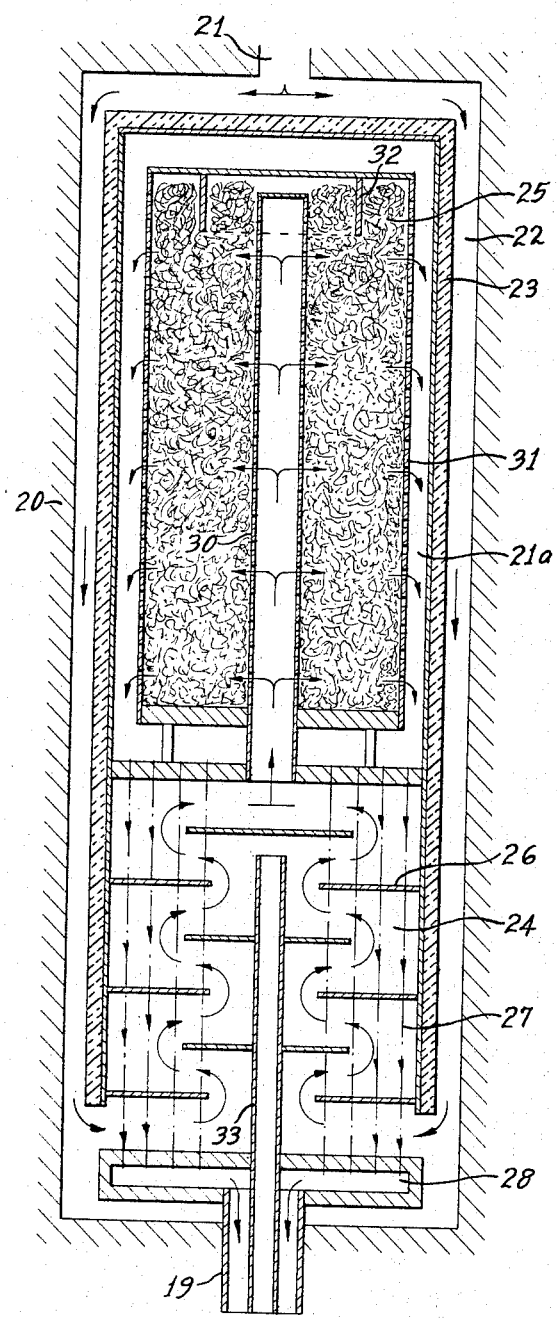

A feature common to almost all reactors presently used in the technical synthesis of ammonia and methanol is that the feed synthesis gas passes through an annular space along the outer pressure shell of the reactor thereby cooling the shell whereupon the synthesis gas is heated through heat exchange with the gas leaving the catalyst section. The synthesis gas then contacts the catalytic material which is normally retained in a special container thermally insulated from the pressure shell and which has means installed therein by which temperature control during the passage of the synthesis gas can be achieved. The reactions involved are exothermic and the temperature control accordingly involves the removal of sufficient heat that the temperature does not exceed the permissible level, the temperature control preferably being effected in such a manner that the reaction occurs close to optimum temperatures. By mounting the heat exchanger and catalyst sections in the same pressure shell, the gas can be fed to and removed from the reactor at a temperature lower than the reaction temperature. However, in some cases, this feature is not employed and the heat exchanger and catalyst sections are placed in separate pressure shells. During the passage of the synthesis gas through the catalyst, the content of the reaction product in the gas mixture is increased and the effluent gas can thereafter, by means of suitable separation equipment, be separated into the desired product and unreacted feed components which, by means of circulating pumps, can be recycled to the reactor and again passed in contact with the catalyst.

The cost of the power required to overcome the pressure drop caused by the passage of the gas through the catalyst bed in the normal axial direction constitutes a considerable portion of the operating cost of technical synthesis processes, and this cost is increased with increased circulating gas volume. Further, the cost of overcoming the pressure drop consists not only in the power cost but, in addition, includes interest and depreciation costs on the circulating equipment which, due to the high pressure and the large gas volumes involved, must be large and heavily constructed. Furthermore, a large pressure drop across the reactor requires a great thickness of the wall between the catalyst section and the aforementioned annular space along the pressure shell inside the reactor, which wall is made of expensive material. By constructing the reactor in such a way that the reaction gas flows in a radial direction through the catalyst bed, the reactor exhibits a lower pressure drop for the same circulating gas volume or, in other words, a considerably larger gas volume can be circulated at the same or even a lower pressure drop.

The present invention provides a reactor in which the reaction gas flows radially through the catalyst bed. This is obtained by a very simple construction of the catalyst container as the synthesis gas, if desired after passage through a heat exchanger in which it is heated by the effluent reaction gas, passes into a perforated central tube in the catalyst bed, passes through the perforations in the tube and flows in a radial direction outwardly through the catalytic material which occupies the annular space between the central tube and a cylindrical perforated wall surrounding the catalytic material. The flow can, if desired, be in the opposite direction through the catalyst bed.

It is known that during operation fixed catalyst beds normally settle somewhat and this settling depends both on the process and catalyst employed, on the filling procedure for the catalyst, and the variations in operation. A layer of ammonia catalyst will, after about five years of operation, often settle about 5 to 10%, i.e., a decrease in catalyst volume of 5 to 10% will be observed. It was to be expected that this feature would give rise to difficulties in a radial flow reactor, but these difficulties can be overcome in a number of different ways. For example, the catalyst can be charged to the reactor in such a way that future settling is avoided, or perforation of the upper 2 to 10% of length of the central tube and perforated wall surrounding the catalyst can be omitted. If the latter construction is employed, the upper part of the catalyst container is filled with catalyst and constitutes a reservoir which in time is used for filling the lower part of the catalyst bed through which the gas flows. The reservoir can also contain inert material or can consist of two metallic tubes which are supported on the surface of the catalyst bed and thereby close the perforations in the central tube as they descend with the shrinking catalyst bed. One or several cylindrical plates can also be connected in a gas-tight manner to the closure of the catalyst container extending down into the bed, in which case the perforations in the central conduit and container wall could be extended to the top of the bed.

The distance through the catalyst bed which the gas must travel is much shorter for a single stage radial flow unit than for an axial flow unit, the flow cross-section is larger, and the contact time is the same. Due to the decreased flow resistance, it is possible to use catalyst of a smaller particle size, and thereby obtain higher activity.

The lower pressure drop makes it possible to use a considerably increased circulation rate through the reactor for a given catalyst volume. Thus, the space velocity, i.e., the gas volume at standard conditions per unit catalyst volume per hour, can be very much increased in proportion to the hitherto used normal space velocities. This results in a somewhat shorter contact time in the catalyst bed and to a lower conversion per pass, but because of the increased circulation rate, the space-time yield, i.e., the production rate per weight unit of catalyst, expressed, for example, in pounds of product per pound of catalyst per hour, will be higher than for the case where a lower space velocity is employed, regardless of whether the catalyst activity has been increased by choosing a smaller particle size.

Thus, it is possible, according to the present invention to design reactors which are of much larger capacity and which have a greater axial length when they are adapted for radial flow than for axial flow. For example, reactors of the axial flow type for the synthesis of ammonia built during recent years, generally produce 100 to 400 tons of ammonia in a 24-hour period and, until the present invention, there has been no reactor built for a production of more than 900 tons of ammonia in a 24-hour period. However, reactors having radial flow are, because of the very low pressure drop obtained even for high space velocities, highly suitable for larger daily production, for example 1000 to 2000 tons of ammonia per 24-hour period. Radial flow reactors are also highly suitable for plants with lower production capacities.

In the case of a radial flow single stage reactor, it is, due to design difficulties, often difficult to effect cooling in an appropriate manner by means of cooling tubes in the catalyst layer. Where the reaction is performed without cooling, the conversion obtainable in practice is restricted because of the heat generated. Depending upon local conditions, it is sometimes desirable to obtain a higher conversion and this can be effected only by cooling the reaction gas in some manner before the reaction is completed. This problem has been solved in a special embodiment of the reactor of the present invention since, in this embodiment, the catalyst bed is axially divided into two sections through which the gas successively flows in a radial direction. By this means, the possibility of dividing the reaction into stages and cooling or otherwise treating the gas between stages is obtained.

In a special embodiment of the reactor according to the present invention, an improvement of the temperature profile is obtained by dividing the reactor into sections and mixing reaction gas with colder synthesis gas between the individual sections. Thus, cooling of the reaction gas is obtained in a mechanically simple manner and, in addition, the possibility of using introduced colder gas for cooling of the pressure shell is provided. This latter feature is of special interest when the reactor does not include an internal heat exchanger. Such a reactor with several sections is mechanically the simplest when the gas alternately passes toward and away from the center of the reactor.

In another embodiment of the reactor of the invention, used, for example, in CO conversion processes, the reaction gas is mixed with water vapor or liquid water between the individual sections. Thereby, a part of the aforementioned cooling and a part of reactant introduction is obtained.

The cooling of the gas between the individual sections of the reactor of the invention can also be obtained by means of heat transfer agents such as water, if desired in such a way that the heat removed is used for the production of steam. This latter arrangement is, in many cases, economically attractive depending on the associated plant equipment.

Figure 2:
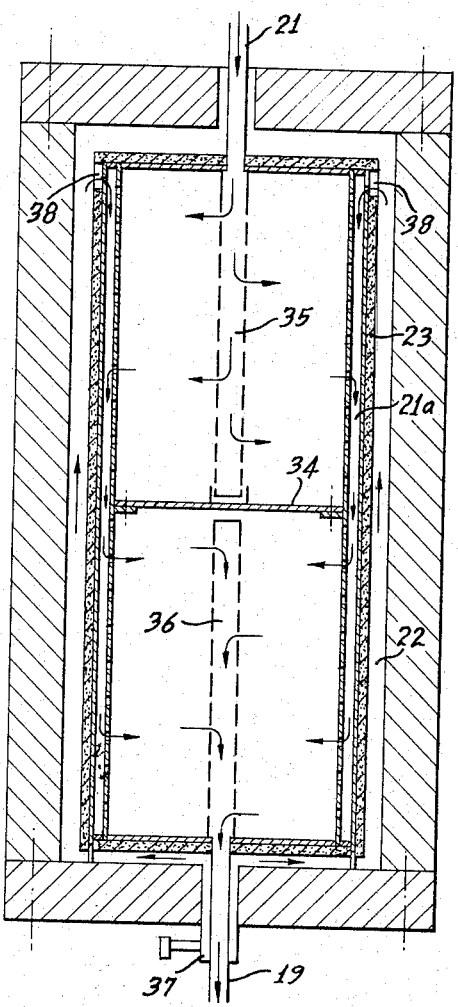
Figure 3:
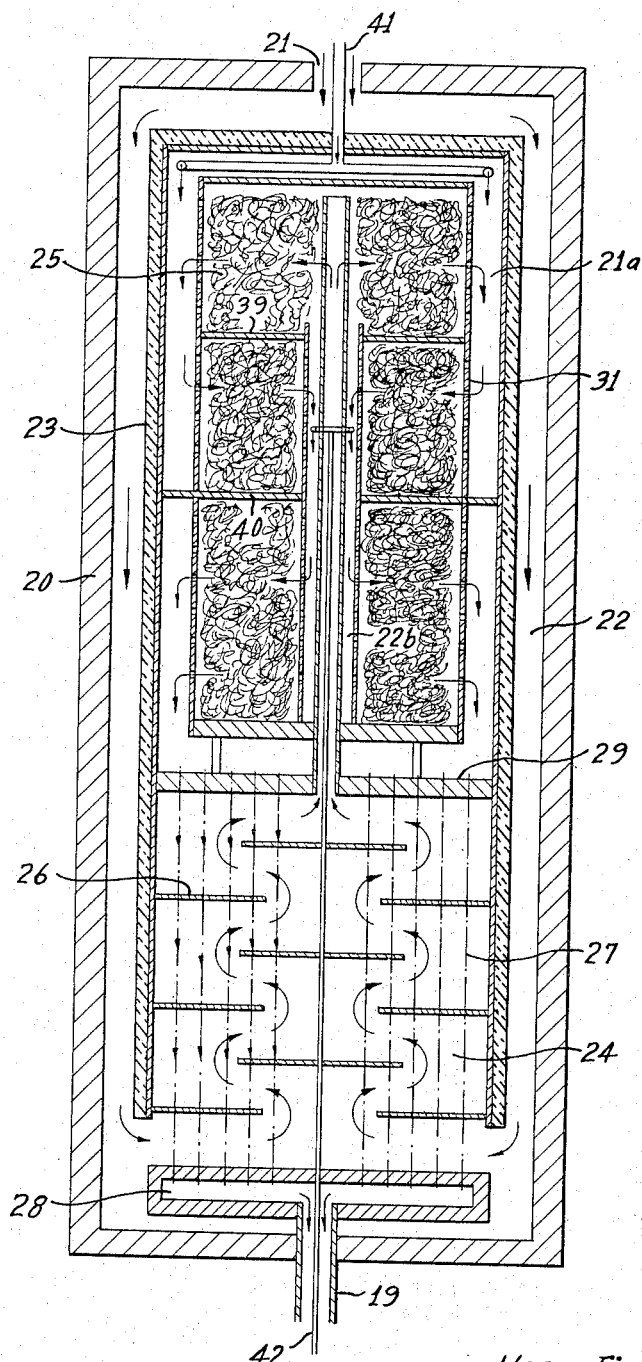

The invention will be further illustrated by reference to the accompanying drawings in which:

FIGURE 1 shows a sectional view in elevation of one embodiment of the reactor according to the present invention having a single stage catalyst bed, internal heat exchanger and annular space along the pressure shell, FIGURE 2 is a sectional view in elevation of another embodiment of the reactor of the invention without an internal heat exchanger and with the catalyst bed divided into two sections with introduction of cold synthesis gas between the sections, the introduced cold gas passing through the annular space around the catalyst container thereby cooling the pressure shell, and FIGURE 3 is a sectional view in elevation of another embodiment of the present invention in which the catalyst bed is divided into three sections with introduction of cold gas between the sections; in this embodiment, the reactor also includes a heat exchanger.

Referring to FIGURE 1, an outlet 19 for reacted gas mixture is provided on the reactor pressure shell 20 and an inlet 21 for feed gas is provided at the top of the reactor. The gas first passes, in known manner, down to the bottom of the reactor along the inside wall of the pressure shell through a narrow annular space 22 which is separated from the catalyst and the heat exchanger by a cylindrical insulated wall 23 surrounding the catalyst section and the heat exchanger. At the bottom of the reactor, the gas passes into the space surrounded by the wall 23, this space containing, at the bottom thereof, a heat exchanger 24 and, in the top thereof, a catalyst 25. The gas flows upwardly through the heat exchanger around the baffles 26 and is thereby contacted with the outlet tubes 27 for the ammonia-enriched gas.

From the heat exchanger section, the gas flows through a central tube or conduit 30 connecting the heat exchanger and the interior of the catalyst bed, this tube being perforated on that portion which extends into the catalyst. The catalyst is contained in a catalyst basket 31, the cylindrical outer wall of which is perforated, and a cylindrical wall 32 is mounted in the top of the catalyst basket which wall extends from the basket closure down into the catalytic material and prevents gas flow through the upper part of the catalytic material, thereby forming a reservoir which counteracts the effect of the settling of the catalytic material during operation. As a result of this arrangement, passage of unreacted gas through the catalyst basket above the catalytic material is prevented. The outer diameter of the catalyst basket is smaller than the inner diameter of the wall 23 so that the gas, after passage through the catalytic material, passes downwardly through the annular space 21a surrounding the catalyst basket and is discharged through the tubes 27. These latter tubes pass through the heat exchanger in the bottom of the reactor and terminate in a collecting space 28 from whence the gas is discharged from the reactor through the outlet tube 19.

In the center of the heat exchanger section, a tube 33 is provided which tube terminates in the upper part of this section and is used to introduce cold synthesis gas into the reactor in an amount which is controlled so as to impart a desired temperature to the gas entering the central tube 30.

In the embodiment of the reactor shown in FIGURE 2, the catalyst basket extends entirely from the top to the bottom of the mantle wall 23, but it is divided by the partition 34 into two sections, each of which is filled with catalytic material. The gas inlet 21 here consists of a tube which passes through the upper closure of the pressure shell to the perforated tube 35 extending downwardly through the upper catalyst section, which latter tube is closed at the bottom thereof. From this tube 35, the gas mixture flows radially outward through the catalytic material to the annular space 21a which, in this embodiment, surrounds both catalyst sections. In the lower section, the gas flows radially toward an axially mounted perforated tube 36 which is closed at the top and which connects with the outlet tube 19. This latter tube is, at the exit through the bottom of the pressure shell, surrounded by a tube 37 through which cold synthesis gas is introduced into the annular space 22 surrounding the insulated mantle 23. Through the inlets 38 in the top of the cylindrical shell 23, this gas passes into the annular space 21a and is there mixed with the partly reacted gas mixture leaving the upper catalyst section, thereby cooling this gas.

In the embodiment of the reactor shown in FIGURE 3, the catalytic section is divided into three parts by the partitions 39 and 40 so that the gas mixture is forced to pass the catalytic material three times in a radial direction, as indicated by the arrows. A tube 41 leads downwardly through the gas inlet 21 to the annular space 21a and serves as an inlet for cold synthesis gas for mixing with and cooling of the gas mixture which has passed the upper catalyst section. Another tube 42 passing through the outlet tube 19 is connected to the annular space 22b between the central tube and the second and third sections of the catalyst bed and also serves as a line for introducing cold synthesis gas into the gas mixture before it enters the third catalyst section.

For ammonia synthesis the catalyst used in the reactor of the present invention is a promoted iron oxide catalyst which is introduced in either an unreduced or a prereduced state. It is known that promoted iron oxide catalysts are catalytically inactive until the iron oxide is reduced to iron and it is also known to accomplish reduction of the iron oxide after the catalytic material is charged to the converter. It is very important that the reduction is effected under such conditions that a high activity of the reduced catalyst is achieved. It is further important that the reduction, which can be effected with hydrogen or with synthesis gas heated to reaction temperature by means of an electrical or fired heating device, proceeds uniformly through the catalyst bed and begins in that end of the bed where the gas is introduced so that the portion of the bed which the gas passes last is also last reduced. As the reduction reaction is not exothermic and as it is not economically feasible to build the heating device so as to provide a heating duty approximately corresponding to the heat release which occurs during ammonia formation when the converter is in normal operation, the circulation rate through the converter must, during the reduction, be maintained at a much lower value than during normal operation. In the converters of the present invention where the cylindrical bed is passed in a radial direction, the linear gas velocity is considerably lower than in known converters of the axial flow type and generally amounts to only a small fraction of the linear gas velocity found in the latter. It is, therefore, important to ensure a regular flow during the reduction and consequently to obtain a sufficiently uniform proceeding of the reduction throughout the catalyst bed to avoid damage to the catalyst. The damage to the catalyst results particularly from the water formed by the reduction process, which water in turn reacts with the free iron already formed. This situation, which can never be completely avoided, has an unfavorable effect on the catalyst activity. It can be minimized by large flow rates incurring the use of large start-up heater piping and the like or by the use of prereduced catalyst which permits the use of smaller start-up facilities with significant cost savings.

In the case of irregular flow or back-diffusion in the catalyst bed, the effect of reduction water on catalyst already reduced is particularly pronounced. However, a few years ago the so-called prereduced catalysts appeared, which catalysts are manufactured from a regular unreduced catalyst in such a way that the content of iron oxide is reduced to free iron whereupon the catalyst is stabilized through a so-called skin oxidation. The prereduced catalyst can be activated in the production converter without releasing substantial amounts of water. It has now been found that when such a prereduced iron catalyst is charged into the converter and there reduced from the state where it contains no more than 10% of the original oxygen content, the result will be a converter in which the catalyst charge possesses just as good an activity as that obtainable in known axial flow converters charged with unreduced or prereduced catalyst.

The prereduced catalyst can be charged into the catalyst bed without stabilization when this is effected under such protected conditions that no oxidation occurs as a result of which the catalyst would become damaged; prereduced catalyst in the stabilized state can also be employed, i.e., the so-called skin oxidized catalyst. With the latter, an easier charging of the catalyst is possible.

The activation of a charge of prereduced catalyst in the reactor of the invention can be effected, for example, as follows: The catalyst is charged into a cylindrical catalyst bed having a perforated central tube and perforated outer wall and the converter is closed. Synthesis gas is then introduced through one of the inlets, which gas flows radially through the catalyst bed, for example from the center line in an outward direction, i.e., through the central tube, the catalytic material, and the perforated or porous outer wall to the annular space surrounding the entire catalyst basket. In another embodiment the gas can also be passed in an opposite direction through the catalyst and removed through the central tube. The catalyst is now activated by heating it to the activation temperature by means of synthesis gas circulated through the converter and a heating device mounted inside or outside the converter. The circulation rate is regulated so that the desired temperature rise is attained; for example, it is controlled by temperature control devices in the central inlet tube. The synthesis gas imparts heat to the catalyst partially by direct conversion and partially by heat transfer through the central tube. As a result, a temperature difference at different heights in the catalyst bed could occur and that portion of the catalyst which is nearest to the hottest portion of the central tube possibly would be activated a short time before the remainder of the catalyst bed. However, because of the use of a prereduced catalyst which does not release substantial amounts of water, this possible nonuniformity in the proceeding of the activation is unimportant insofar as the activity of the catalyst is concerned. The activation proceeds by regulation of the flow in order to obtain the desired temperatures throughout the entire catalyst bed. At the end of the activation, the heating of the synthesis gas is gradually diminished and finally stopped as the catalytic material can be maintained in the usual manner at the desired temperature by means of the reaction heat produced by the ammonia synthesis.

The invention will be further illustrated by reference to the following specific examples:

*Example 1*

This example illustrates the limitations encountered when designing large ammonia converters based on classical designs. This example is based on the so-called TVA type converter, which is an axial flow converter with countercurrent heat exchange in the catalyst bed, and having a capacity of 500 metric tons per day of ammonia. The example also illustrates how the size of the synthesis converter is affected by the method of manufacturing the synthesis gas. This example is based on the use of synthesis gas containing only small amounts of inert gases and assumes the use of a nitrogen wash for final purification. The pressure assumed is 300 atmospheres absolute which is typical of plants built during recent years.

Main converter data:

| | |
|---|---|
| Inner diameter of pressure shell (50″) __m__ | 1.27 |
| Catalyst bed diameter _____m__ | 1.10 |
| Catalyst bed height _____m__ | 12.68 |
| Number of cooling tubes _____ | 73 |
| Catalyst volume _____m.$^3$__ | 10.26 |
| Height of lower exchanger _____m__ | 1.50 |
| Inner height of pressure shell _____m__ | 15.30 |
| Catalyst particle diameter _____mm__ | 10 |

Operating data:

| | |
|---|---|
| Production rate _____m.t.p.d__ | 499 |
| Pressure _____atm. abs__ | 300 |
| Circulating gas volume _____Nm.$^3$/h__ | 203,800 |
| Space velocity _____Nm.$^3$/m.$^3$/h__ | 19,870 |
| Converter inlet temperature _____° C__ | 30 |
| Converter outlet temperature _____° C__ | 262 |

Gas composition at inlet:

| | |
|---|---|
| $H_2$ _____mole percent__ | 71.25 |
| $N_2$ _____do____ | 23.75 |
| $NH_3$ _____do____ | 3.0 |
| A _____do____ | 2.0 |
| CO _____p.p.m__ | 2.0 |
| Catalyst inlet temperature _____° C__ | 410 |
| Hot spot temperature _____° C__ | 524 |
| Outlet ammonia concentration _____mole percent__ | 18.98 |
| Catalyst pressure drop _____atm__ | 10.3 |
| Total converter pressure drop _____atm__ | 10.7 |

These data are for a three-year-old catalyst charge.

Gas composition at inlet:

| | | |
|---|---|---|
| $H_2$ | mole percent | 63.75 |
| $N_2$ | do | 21.25 |
| $NH_3$ | do | 3.0 |
| A | do | 4.0 |
| $CH_4$ | do | 8.0 |
| CO | p.p.m. | 2 |
| Catalyst inlet temperature | °C | 380 |
| Hot spot temperature | °C | 499 |
| Outlet ammonia concentration | mole percent | 11.35 |
| Catalyst pressure drop | atm | <1.0 |
| Total converter pressure drop | atm | 5.0 |

This example is based on a three year old catalyst charge.

Example 5

It is often economically attractive to use a different converter design where the catalyst mass is divided into several beds between which quench is applied. Such a radial quench converter is shown in FIGURE 3 of the drawings.

The introduction of quench or heat exchange between beds is desirable where operating conditions permit a higher conversion and where, consequently, the temperature increase in the catalyst is greater. It is, of course, possible to divide the catalyst mass into more than three beds but in some cases the simple quench converter of the type shown in FIGURE 3 of the drawings or one having two beds is more attractive.

The design parameters and operating conditions for a 500 metric ton per day ammonia 2-bed radial converter operating at 150 atmospheres absolute pressure and with an assumed inlet ammonia concentration of 3% are as follows:

Main converter data:
Inner diameter of pressure shell (56″)

| | | |
|---|---|---|
| Catalyst bed diameter | m | 1.42 |
| Height of first bed | m | 1.22 |
| Height of second bed | m | 4.30 |
| Total catalyst volume | m.³ | 10.85 |
| Height of lower exchanger | m | 17.87 |
| Inner height of pressure shell | m | 6.60 |
| Catalyst particle diameter | mm | 22.9 |
| | | 2 |

Operating data:

| | | |
|---|---|---|
| Production rate | m.t.p.d | 498 |
| Pressure | atm. abs | 150 |
| Circulating gas volume | Nm.³/h | 350,000 |
| Space velocity | Nm.³/m.³/h | 19,585 |
| Converter inlet temperature | °C | 30 |
| Converter outlet temperature | °C | 158 |

Gas composition at inlet:

| | | |
|---|---|---|
| $H_2$ | mole percent | 63.75 |
| $N_2$ | do | 21.25 |
| $NH_3$ | do | 3.0 |
| A | do | 4.0 |
| $CH_4$ | do | 8.0 |
| CO | p.p.m. | 2 |
| Catalyst inlet temperature | °C | 410 |
| Hot spot temperature | °C | 494 |
| Outlet ammonia concentration | mole percent | 11.71 |
| Catalyst pressure drop | atm | <1.0 |
| Total converter pressure drop | atm | 3.5 |

This example is based on a catalyst age of three years.

The design parameters and operating conditions for a 1000 metric ton per day ammonia 2-bed radial converter operating at 150 atmospheres absolute pressure and with an assumed inlet ammonia concentration of 3% are as follows:

Main converter data:
Inner diameter of pressure shell (92″)

| | | |
|---|---|---|
| Catalyst bed diameter | m | 2.33 |
| Height of first bed | m | 2.11 |
| Height of second bed | m | 3.20 |
| Total catalyst volume | m | 8.60 |
| Height of lower exchanger | m.³ | 37.10 |
| Inner height of pressure shell | m | 5.10 |
| Catalyst particle diameter | m | 18.50 |
| | mm | 2 |

Operating data:

| | | |
|---|---|---|
| Production rate | m.t.p.d | 996 |
| Pressure | atm. abs | 150 |
| Circulating gas volume | Nm.³/h | 690,000 |
| Space velocity | Nm.³/m.³/h | 18,590 |
| Converter inlet temperature | °C | 30 |
| Converter outlet temperature | °C | 159 |

Gas composition at inlet:

| | | |
|---|---|---|
| $H_2$ | mole percent | 63.75 |
| $N_2$ | do | 21.25 |
| $NH_3$ | do | 3.0 |
| A | do | 4.0 |
| $CH_4$ | do | 8.0 |
| CO | p.p.m. | 2 |
| Catalyst inlet temperature | °C | 410 |
| Hot spot temperature | °C | 499 |
| Outlet ammonia concentration | mole percent | 11.85 |
| Catalyst pressure drop | atm | <1.0 |
| Total converter pressure drop | atm | 4.5 |

This example is also based on a catalyst age of three years.

From the foregoing it will be seen that using the radial flow design, the dimensions of a 1000 metric ton per day ammonia converter are reasonable and within the capabilities of a number of pressure shell fabricators even with a full diameter closure. Further, there is the possibility of placing the heat exchanger and catalyst sections in separate pressure shells, resulting in vessels with smaller inner diameter and height. If a layout of this type is employed, a part of the cold gas passes down along the inner wall of the pressure shell containing the catalyst basket before it enters the heat exchanger. Further, using a radial quench converter, the catalyst beds can be concentrically mounted in the catalyst section.

The radial flow converters of the present invention are not limited to use in large units. They have a number of features, as will be seen from the foregoing, which are desirable also in smaller units, such as high capacity per unit of converter volume, low pressure drop, and simple mechanical design. The converters thus lend themselves to use in package units of small capacity.

The single bed radial flow converter shown in FIGURE 1 of the drawings is particular attractive for a synthesis loop without refrigeration cooling where the gas enters the synthesis converter with a relatively high concentration of ammonia.

The radial converters of the invention can also be used to increase the capacity of existing synthesis loops. For example, the capacity of existing synthesis loops is increased by merely installing a radial flow converter, a water cooler, and a separator in series with the existing units in the loop. The additional pressure drop resulting from the radial converter is so low that normally the existing circulating compressor can overcome the small additional pressure drop. The radial converters of the invention are also of advantage where a stepwise expansion of an ammonia loop is intended in the original plant design. Here, the addition of radial converters in series is the ideal solution.

It will be obvious to those skilled in the art that many modifications may be made within the scope of the present invention without departing from the spirit thereof, and the invention includes all such modifications.

What is claimed is:
1. A process for performing catalytic reactions in the gaseous phase which comprises introducing a synthesis gas into a generally cylindrical reaction zone having a plurality of vertically spaced separate bodies of catalyst therein, passing the synthesis gas through the catalyst bodies in succession in opposite radial directions, and removing from the reaction zone a gas which is enriched in the desired product.

2. A process according to claim 1 in which the synthesis gas comprises nitrogen and hydrogen.

3. A process according to claim 1 in which the synthesis gas comprises carbon monoxide and hydrogen.

4. A process according to claim 1 in which cold synthesis gas is added to the synthesis gas between bodies of catalyst.

5. A process according to claim 1 in which the synthesis gas is mixed between bodies of catalyst with a member selected from the group consisting of steam and liquid water.

6. A process according to claim 1 in which the synthesis gas is cooled between bodies of catalyst, without the addition of material thereto, in a manner such that the removed heat can be utilized.

7. A reactor for performing catalytic reactions in the gaseous phase comprising a pressure shell having a plurality of vertically spaced separate bodies of catalyst therein, means for passing a synthesis gas into the pressure shell, means for passing the gas through the catalyst bodies successively in opposite radial directions, and means for withdrawing a product gas from the pressure shell.

8. A reactor according to claim 7 including means for adding cold synthesis gas to the synthesis gas between the catalyst bodies.

9. A reactor according to claim 7 including means for mixing the synthesis gas between bodies of catalyst with a member selected from the group consisting of steam and liquid water.

10. A reactor according to claim 7 including means for cooling the synthesis gas between bodies of catalyst, without the addition of material thereto, whereby the removed heat can be utilized.

References Cited

UNITED STATES PATENTS

| | | | |
|---|---|---|---|
| 1,909,442 | 5/1933 | Williams | 23—198 |
| 2,279,153 | 4/1942 | Wilcox | 260—449.5 |
| 2,494,561 | 1/1950 | Kemp | 23—198 |
| 2,512,586 | 6/1950 | Stengel | 23—198 |
| 2,861,873 | 11/1958 | Worn | 23—198 |

MILTON WEISSMAN, *Primary Examiner.*

OSCAR R. VERTIZ, *Examiner.*

H. S. MILLER, *Assistant Examiner.*